(12) United States Patent
Schumaier

(10) Patent No.: US 6,302,060 B1
(45) Date of Patent: Oct. 16, 2001

(54) MAGNETIC PET LITTER SYSTEM

(76) Inventor: Daniel R. Schumaier, 1548 Blue Springs Rd., Elizabethton, TN (US) 37643

( * ) Notice: Subject to any disclaimer, the term of this patent is extended or adjusted under 35 U.S.C. 154(b) by 0 days.

(21) Appl. No.: 09/608,901

(22) Filed: Jul. 3, 2000

(51) Int. Cl.[7] ................................................. A01K 29/00
(52) U.S. Cl. ......................................................... 119/165
(58) Field of Search .................................. 119/165, 161, 119/166, 174, 162, 163

(56) References Cited

U.S. PATENT DOCUMENTS

| | | |
|---|---|---|
| 3,546,643 | 12/1970 | Virostek . |
| 4,107,811 | 8/1978 | Imsande . |
| 4,152,210 | 5/1979 | Robinson et al. . |
| 4,306,516 | 12/1981 | Currey . |
| 4,504,505 | 3/1985 | Rodriguez et al. . |
| 4,766,845 | 8/1988 | Bavas . |
| 5,042,430 | 8/1991 | Casmira . |
| 5,092,277 | 3/1992 | Baillie et al. . |
| 5,113,801 * | 5/1992 | Rotstein et al. ..................... 119/163 |
| 5,195,464 | 3/1993 | Mutter . |
| 5,218,930 | 6/1993 | Casmira . |
| 5,220,886 | 6/1993 | Hyde . |
| 5,524,317 | 6/1996 | Nagahama et al. . |
| 5,791,288 * | 8/1998 | Ehrler ..................................... 119/163 |
| 5,816,195 | 10/1998 | Flynn . |
| 5,924,383 | 7/1999 | Smith . |
| 5,956,798 | 9/1999 | Nemoto et al. . |
| 5,970,556 | 10/1999 | Nemoto . |
| 6,050,223 | 4/2000 | Harris . |

* cited by examiner

*Primary Examiner*—Thomas Price
(74) *Attorney, Agent, or Firm*—Luedeka, Neely & Graham, P.C.

(57) ABSTRACT

A magnetic pet litter system minimizes scattering of particulate litter by pets such as cats. The system includes a particulate pet litter containing a material, such as iron, capable of being attracted by a magnet. A magnet is positioned external to a litter containment area so that as the pet exists the litter containment area, particles of the magnetically attractable litter tracked outside the litter containment area by the pet are attracted to and collected by the magnet. A mat or rug may also be positioned over the magnet to collect the litter particles. During clean up, the mat and magnet are separated and the collected litter is discarded. The magnet may be either a permanent magnet or an electromagnet. A pet activated switch is employed to turn the electromagnet on and off. In an alternate embodiment, a charge generator produces an electrical differential between the litter and a mat to attract litter particles to the mat.

28 Claims, 2 Drawing Sheets

MAGNETIC PET LITTER SYSTEM

BACKGROUND

1. Field of the Invention

The present invention relates generally to pet litter collection devices. More particularly, the present invention relates to a pet litter system which collects particulate pet litter by magnetic attraction.

2. Background of the Invention

Pets such as cats that use litter boxes always seem to scatter particles of litter outside the litter box, which leaves an unsanitary mess for the pet owner to clean. This typically happens when, upon exiting the box, the pet scatters litter with its feet. A number of different types of devices are available to help reduce the mess. For example, one general approach has been to provide specially textured rugs, mats, or gratings placed outside the litter box. As the pet steps on the rug upon exiting the litter box, the rug is intended to spread the animal's paws, thereby allowing the litter to release from the pet's feet. These and other devices desire improvement.

Accordingly, there is a need in the art for improved devices and methods to avoid messes associated with the use of litter boxes.

SUMMARY OF THE INVENTION

The present invention eliminates the difficulties and disadvantages of the prior art by the use of magnetically attractable litter particles with an apparatus for collecting particles of the pet litter brought outside a litter containment area by a pet. The apparatus includes one or more magnets external to the litter containment area for attracting particles of the magnetically attractable litter which have been tracked or otherwise brought outside the litter containment area by the pet. An overlay, such as a mat or disposable paper covering, may also be positioned adjacent to the magnet(s) to receive and collect litter particles attracted by the magnet (s).

The magnetically attractable pet litter includes a material, such as iron, cobalt, nickel, gadolinium, and alloys containing one or more such materials capable of being attracted to the magnet(s). The magnetically attractable materials are blended or embedded with a desiccating material, such as sodium bentonite clay, so as to form a particulate pet litter containing five percent or more by weight of the magnetically attractable material.

The magnet(s) may take a variety of forms. In one embodiment, the magnet(s) includes a permanent magnet which is preferably flexible so as to conform to uneven surfaces on which it may be placed. Fasteners can be provided to attach the overlay to the magnet(s) to prevent slippage of the overlay which may occur, for example, as the pet moves across the overlay. Clean up of litter particles collected onto the overlay requires little effort. The overlay is separated from the magnet(s) and the collected litter is discarded.

In another embodiment, the magnet(s) includes an electromagnet connected to a source of electrical power. Removal of electrical power to the electromagnet enables the pet owner to easily discard litter particles collected by the electromagnet. Power can be removed by unplugging the electromagnet from its source of power. Alternatively, a pet activated switch is provided to turn the electromagnet on and off.

The invention also provides a pet litter collection apparatus which includes a pet litter box or other litter containment structure. Pet litter contained in the litter box includes a material capable of being electrically charged to a first polarity. A mat positioned external to the litter box is capable of being charged to a second polarity opposite to that of the pet litter. A charge generator provides electrical charging of the pet litter and the mat to maintain an electrical charge differential between the two, whereby particles of the pet litter brought outside the litter box are attracted to the mat by the electrical charge differential.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DETAILED DESCRIPTION OF THE PREFERRED EMBODIMENT(S)

Figure 1:
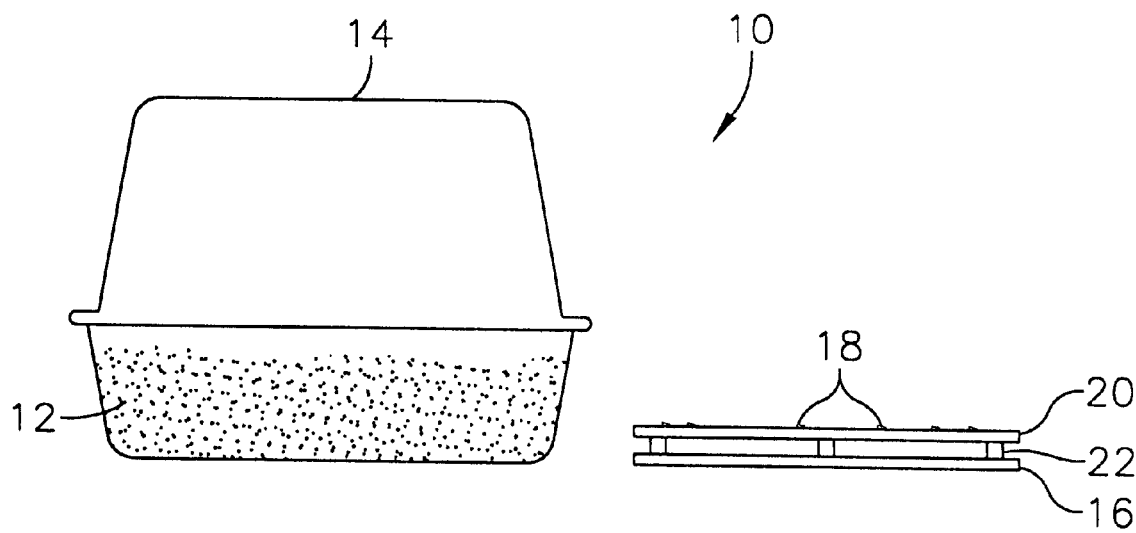
FIG. 1 is a side view of a magnetic pet litter containment system employing a permanent magnet fastened to an overlay according to the invention.

With reference now to the drawings in which like reference characters designate like or similar parts throughout the several views, a magnetic pet litter system 10 according to the invention is illustrated in FIG. 1. The magnetic pet litter system 10 includes a magnetically attractable pet litter 12 contained within a pet litter box 14 or other litter containment structure. A permanent magnet 16 (or a plurality of magnets) is positioned externally to the litter box 14 to magnetically attract and collect particles 18 of litter brought outside the litter box 14 by a pet such as a cat. In a preferred embodiment, the magnet 16 is rubberized and flexible so as to conform to uneven surfaces on which it may be placed.

The pet litter 12 is a particulate type with each of the particles including sufficient quantities of a magnetically attractable material to provide magnetic attraction between the magnet 16 and the litter particles 18. In a preferred embodiment, the pet litter is a mixture of sodium bentonite clay or other desiccating material (such as paper, straw, corn cobs, and other cellulosic materials) and 5% or more by weight of iron or ferrous alloy. A preferred method of forming the litter particles is to blend iron or iron oxide in slurry form with a desiccant such as sodium bentonite clay. A suitable sodium bentonite clay desiccant is disclosed in U.S. Pat. No. 5,503,111, the entire contents of which is incorporated herein by reference. Other magnetically attractable materials suitable for use in a magnetic pet litter 12 include cobalt, nickel, gadolinium, and alloys containing one or more such magnetically attractable materials.

With continued reference to FIG. 1, in a preferred embodiment an overlay 20, such as a mat, rug, or disposable paper covering, is placed over the magnet 18 to collect litter particles 18 attracted by the magnet 18. The overlay 20 may be textured to frictionally remove litter particles 18 from the pet's feet. The overlay 20 may also include a plurality of ridges which splay the pet's toes to enhance removal of litter particles 18 which may become lodged between the toes. To prevent slippage between the overlay 20 and magnet 16, one or more fasteners 22 may be employed to attach the overlay 20 to the magnet 16. Suitable fasteners include snaps, velcro, and magnets or magnetically attractable materials attached to the lower surface of the overlay 20. Clean up of litter 12 brought outside the litter box 14 requires little effort The overlay 20 is separated from the magnet 16 and litter particles 18 which have collected onto the overlay 20 are discarded.

Figure 2:
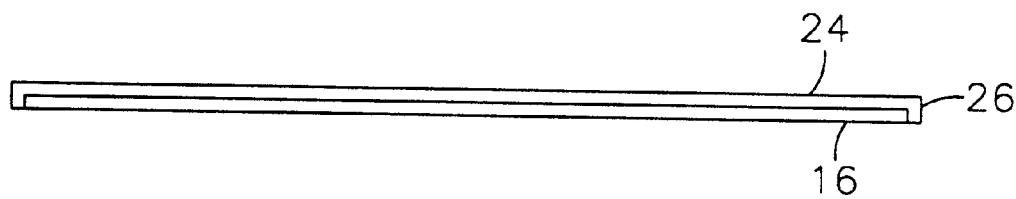
FIG. 2 is a side view of an alternate embodiment of a permanent magnet according to the invention, where an overlay is loosely placed over the permanent magnet.

FIG. 2 shows an alternate embodiment of an overlay 24 having peripheral walls 26 which, when positioned about the perimeter of the magnet 16 as shown, inhibit slippage between the overlay 24 and magnet 16 without the need for fasteners. This embodiment makes it easier to separate the overlay 24 and magnet 16 for clean up of litter particles attracted by the magnet 16.

Figure 3:
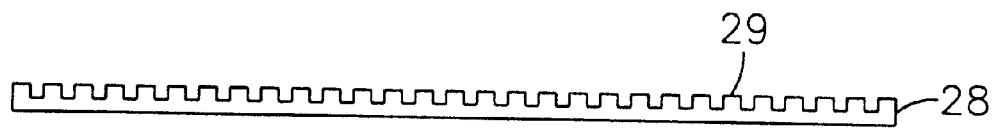
FIG. 3 is a side view of a flexible permanent magnet with surface texturing according to the invention.

FIG. 3 shows an alternate embodiment of permanent magnet 28 for use according to the invention. The magnet 28 is preferably flexible and includes a plurality of flexible ridges 29 formed along the upper surface of the magnet 28. Upon exit from the litter containment area 14 and when the pet steps on the magnet 28, the ridges 29 help to splay the pet's paws and thereby enhance the removal of litter which may have become entrapped between the pet's toes.

Figure 4:
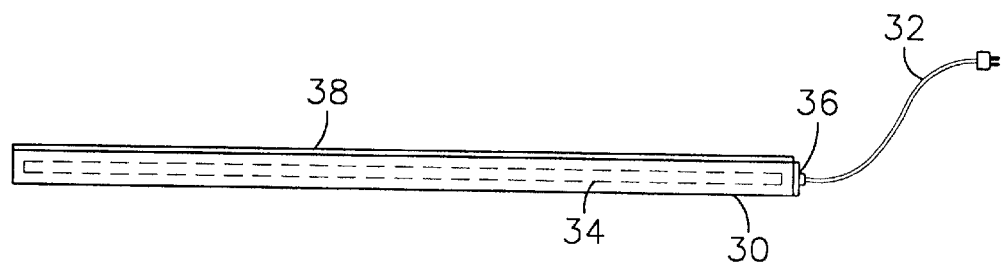
FIG. 4 is a side view of a magnetic pet litter containment system employing an electromagnet with a pet activated switch for turning the electromagnet on and off.

In a further embodiment of the invention shown in FIG. 4, an electromagnet 30 is employed to attract and collect litter particles brought outside the litter box 14. The electromagnet 30 includes a power cord 32 which is plugged into a standard 110 volt receptacle to supply power to an electromagnetic element 34. Litter particles attracted by the electromagnet 30 are easily removed during clean up by removing power and discarding the collected particles. Power can be removed by unplugging the power cord 32 from the receptacle, or power can be removed by unplugging the power cord 32 from the electromagnet 30 at connector 36. Unplugging the power cord 32 at connector 36 eliminates the hassle of having to deal with a dangling cord 32 during clean up.

The electromagnet 30 may also be equipped with a switch 38 that is activated by the pet to power the electromagnet 30 on and off. Employing a pet activated switch 38 provides the advantage of conserving power by applying power to the electromagnetic element 34 when it is needed most as the pet exits the litter box 14. In a preferred embodiment, the switch 38 is a membrane type switch adjacent the upper surface of the electromagnet 30. The pet steps on the switch 38 as it exits the litter box 38, which completes the electrical circuit supplying power to turn the electromagnetic element 34 on. With the electromagnetic element 34 on, litter particles brought outside the litter box 14 by the pet are attracted to and collected by the electromagnet 30. When the pet steps off of the switch 38, the circuit is opened and power is removed from the electromagnetic element 34. A timer may also be employed to maintain electrical power to the electromagnetic element 34 for a desired period of time when the switch 38 is activated.

Figure 5:
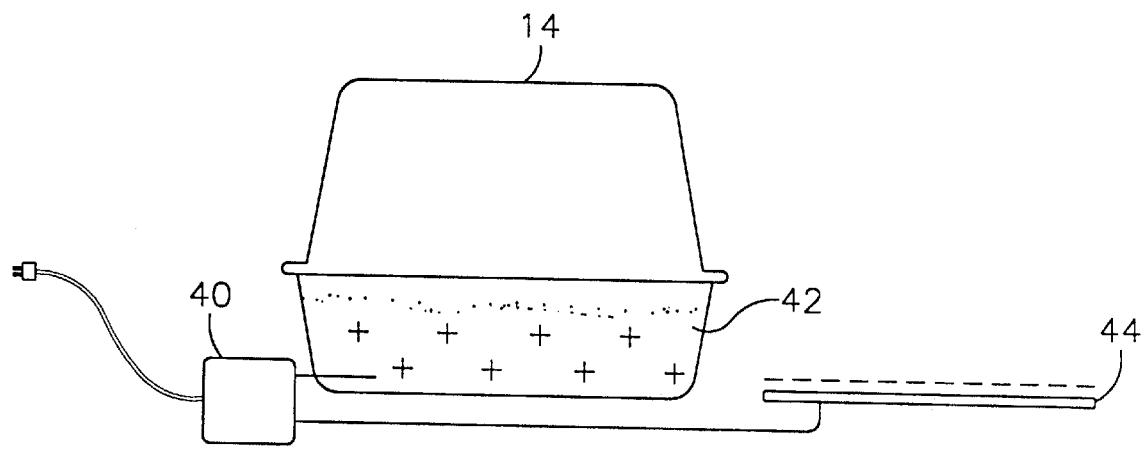
FIG. 5 is a side view of magnetic pet litter system employing a charge generator for generating an electrical differential between the pet litter and a mat according to the invention.

FIG. 5 shows yet a further embodiment of the invention. A charge generator 40 is connected to the pet litter 42 to produce an electrical charge (either positive or negative) on the litter 42. The charge generator 40 is also connected to a mat 44 to produce an electrical charge opposite to the electrical charge of the pet litter 42. Litter particles brought outside the litter box 14 by the pet are attracted to and collected by the mat 44 as a result of the electrical charge differential.

It will be appreciated that significant advantages are realized in a magnetic pet litter system according to the invention. For example, instead of relying passively on the positioning and texture of a mat or other form of overlay placed outside the litter box, the invention provides a positive force which is applied directly to litter particles tracked outside the litter box by the pet. Litter particles which become airborne upon the pet's exit are attracted by the magnet to prevent scatter. Likewise, litter particles which cling to the pet's feet are also acted upon by magnetic forces to enhance removal of the litter particles from the pet's feet and thereby inhibit tracking of the litter away from the litter box. Once attracted to the magnet, the litter particles are continuously held at a single collection point. This minimizes further scattering of the litter and also minimizes any unsanitary conditions caused by litter which is brought outside the litter box by the pet. Collecting the litter particles onto an overlay placed over the magnet enhances clean up as the pet owner can simply separate the overlay and magnet (for permanent magnet embodiments) or remove power to an electromagnetic element and then discard the collected litter.

While the invention has been described in detail, it is to be expressly understood that it will be apparent to persons skilled in the relevant art that various changes in form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. An apparatus for collecting particles of a magnetically attractable pet litter brought outside a litter containment area by a pet, the apparatus comprising:

one or more magnets external to the litter containment area for attracting particles of the magnetically attractable pet litter brought outside the litter containment area by a pet; and an overlay adjacent said one or more magnets for receiving litter particles attracted by the one or more magnets.

2. The apparatus of claim 1, wherein said one or more magnets includes a permanent magnet.

3. The apparatus of claim 2, wherein said permanent magnet includes a flexible permanent magnet.

4. The apparatus of claim 1, wherein said one or more magnets includes an electromagnet.

5. The apparatus of claim 4, further comprising a switch for being activated by a pet to turn the electromagnet on and off.

6. The apparatus of claim 1, further comprising a fastener for attaching the overlay to the one or more magnets.

7. The apparatus of claim 1, wherein said magnetically attractable pet litter includes a ferrite material.

8. The apparatus of claim 1, wherein said overlay further includes a plurality of ridges to enhance removal of litter particles from the pet's feet.

9. An apparatus for collecting particles of pet litter brought outside a litter containment area by a pet, the apparatus comprising:

a particulate pet litter containing a material capable of being attracted to a magnet; and one or more magnets external to a litter containment area for attracting particles of the pet litter brought outside the litter containment area by a pet.

10. The apparatus of claim 9, wherein said one or more magnets includes a permanent magnet.

11. The apparatus of claim 10, wherein said permanent magnet includes a flexible permanent magnet.

12. The apparatus of claim 9, wherein said one or more magnets includes an electromagnet.

13. The apparatus of claim 12, further comprising a switch for being activated by a pet to turn the electromagnet on and off.

14. The apparatus of claim 9, further comprising an overlay adjacent said one or more magnets for receiving particles of litter attracted by the one or more magnets.

15. The apparatus of claim 14, further comprising a fastener for attaching the overlay to the one or more magnets.

16. The apparatus of claim 9, wherein said material capable of being attracted to a magnet includes a ferrite material.

17. A pet litter collection apparatus comprising:
a pet litter containment structure;
a pet litter contained in said pet litter containment structure, the pet litter including particles containing a material capable of being attracted to a magnet; and
one or more magnets external to said litter containment structure for attracting particles of the pet litter brought outside the litter containment structure by a pet.

18. The pet litter collection apparatus of claim 17, wherein said one or more magnets includes a permanent magnet.

19. The pet litter collection apparatus of claim 18, wherein said permanent magnet includes a flexible permanent magnet.

20. The pet litter collection apparatus of claim 17, wherein said one or more magnets includes an electromagnet.

21. The pet litter collection apparatus of claim 20, further comprising a switch for being activated by a pet to turn the electromagnet on and off.

22. The pet litter collection apparatus of claim 17, further comprising an overlay adjacent said one or more magnets for collecting particles of litter attracted by the one or more magnets.

23. The pet litter collection apparatus of claim 22, further comprising a fastener for attaching the overlay to the one or more magnets.

24. A particulate pet litter comprising:
a desiccant; and
a magnetically attractable material comprising five percent or more by weight the particulate pet litter.

25. The pet litter of claim 24, wherein said desiccant includes sodium bentonite clay.

26. The pet litter of claim 24, wherein said desiccant includes a cellulosic material.

27. The pet litter of claim 24, wherein said magnetically attractable material includes a ferrite material.

28. A pet litter collection apparatus comprising:
a pet litter containment structure;
a pet litter contained in said pet litter containment structure, the pet litter including particles containing a material capable of being electrically charged to a first polarity;
a mat external to said litter containment structure, said mat capable of being electrically charged to a second polarity opposite to said first polarity to produce an electrical charge differential between the pet litter and the mat; and
a charge generator for charging said pet litter to said first polarity and charging said mat to said second polarity, whereby particles of the pet litter brought outside the litter containment area by a pet are attracted to said mat by the electrical charge differential.

* * * * *